No. 774,889. PATENTED NOV. 15, 1904.
E. E. MURPHY.
DISPENSING APPARATUS.
APPLICATION FILED JULY 22, 1904.
NO MODEL. 2 SHEETS—SHEET 1.
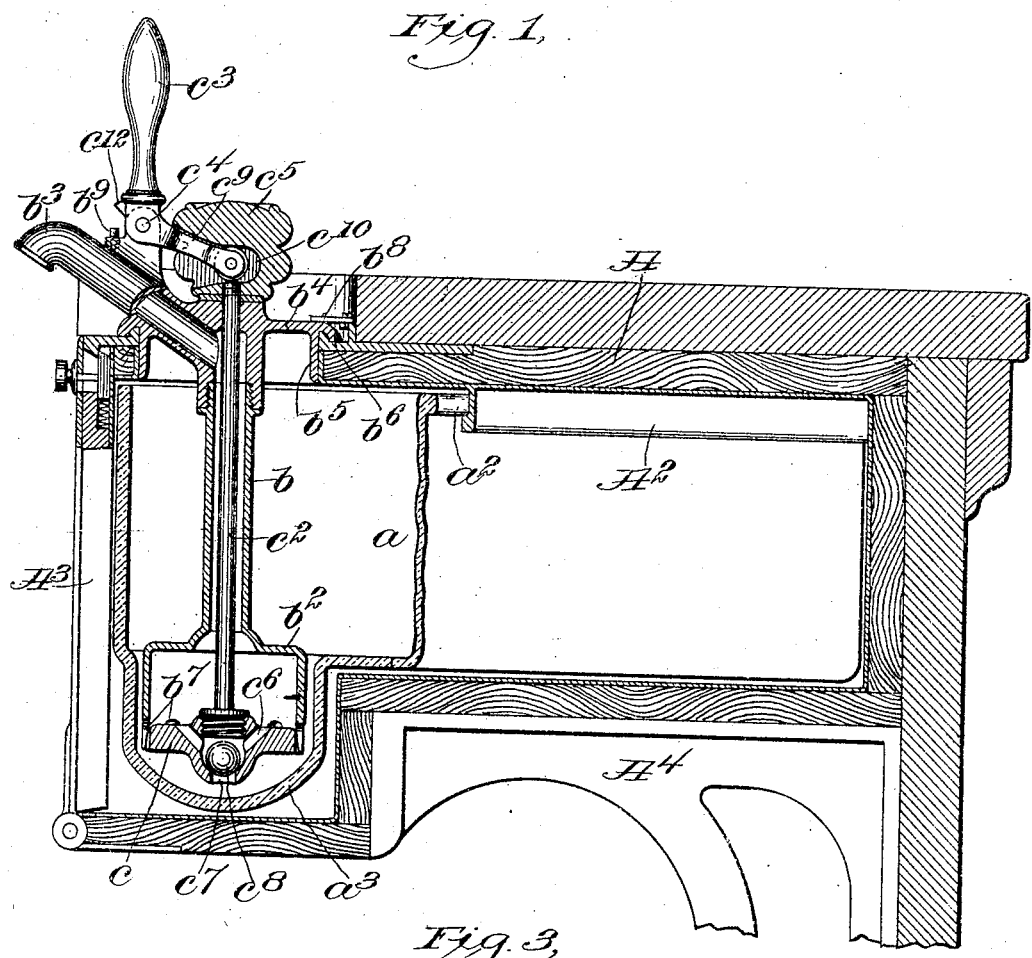
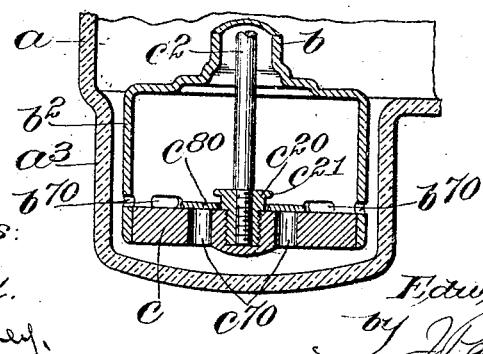

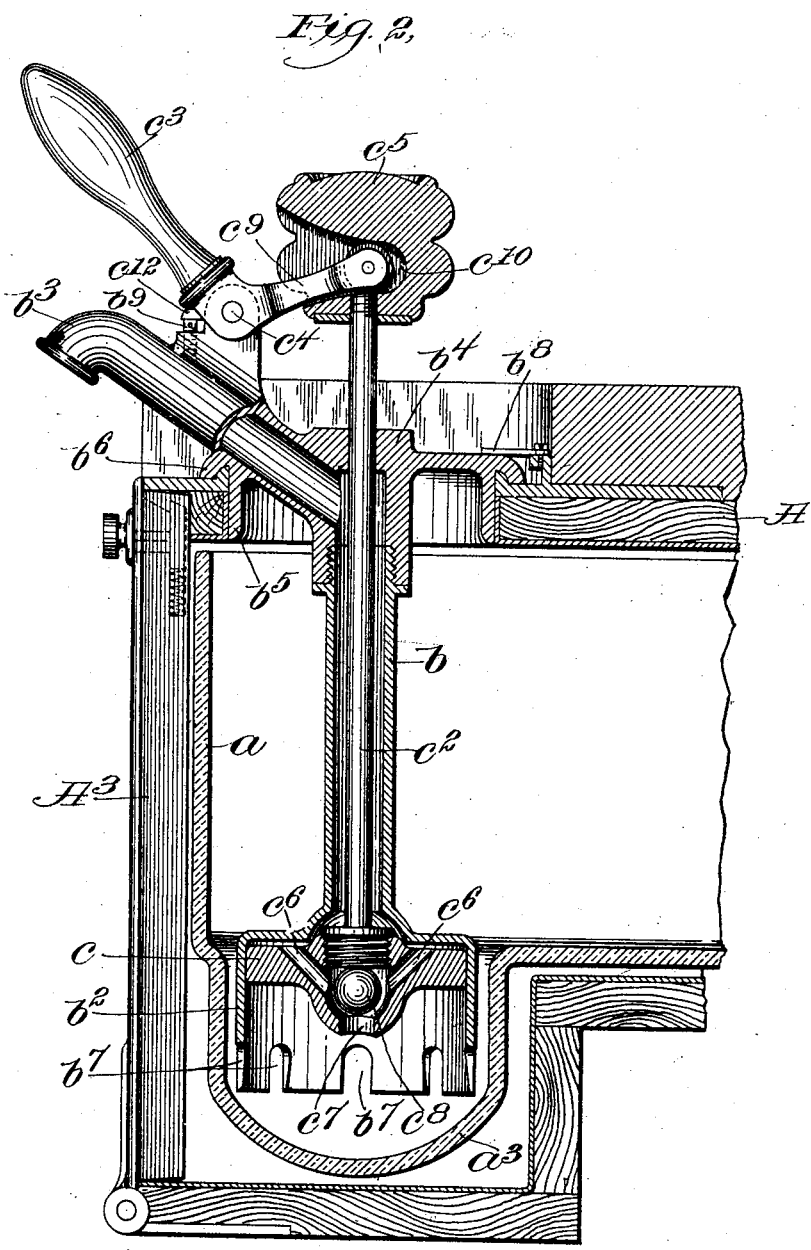

No. 774,889.

Patented November 15, 1904.

UNITED STATES PATENT OFFICE.

EDWARD E. MURPHY, OF CHELSEA, MASSACHUSETTS, ASSIGNOR TO PUFFER MANUFACTURING COMPANY, A CORPORATION OF MAINE.

DISPENSING APPARATUS.

SPECIFICATION forming part of Letters Patent No. 774,889, dated November 15, 1904.

Application filed July 22, 1904. Serial No. 217,676. (No model.)

*To all whom it may concern:*

Be it known that I, EDWARD E. MURPHY, a citizen of the United States, residing in Chelsea, county of Suffolk, and State of Massachusetts, have invented an Improvement in Dispensing Apparatus, of which the following description, in connection with the accompanying drawings, is a specification, like letters on the drawings representing like parts.

The present invention relates to a dispensing apparatus for syrups used at soda-fountains, and is embodied in an apparatus of that type in which the syrup is contained in a jar and delivered therefrom through a valveless tube in substantially measured quantities at each operation.

In a dispensing apparatus of this type the jar is provided with a trap or reservoir at the bottom, and a dispensing-tube leading from the said trap is provided with means for forcing a predetermined amount of syrup from said trap through the tube, so that a definite quantity of syrup is delivered at each operation.

The apparatus embodying the invention is very accurate in measuring the amount of syrup and is adapted for rapid consecutive operations.

Figure 1 is a longitudinal section, partly in elevation, of a dispensing apparatus embodying the invention. Fig. 2 is a similar view enlarged, showing the dispensing device in the position assumed after the syrup has been delivered and the plunger started on its downward movement; and Fig. 3 is a detail drawn on the same scale as Fig. 2, showing a modification.

The jar $a$ is shown as of a type commonly employed, being arranged with flanges $a^2$, supported on shoulders $A^2$ within a casing A, into which the jar is slid, the casing then being closed by means of a gate or cover $A^3$. In the construction shown the casing is underneath and behind the counter, being supported on brackets $A^4$. The jar $a$ is provided with a supplemental chamber or trap $a^3$ to contain the measuring-chamber $b^2$ of the dispensing-tube $b$, which is provided with a suitable outlet-nozzle $b^3$. The said chamber $b^2$ is of such size as to contain the amount of syrup to be delivered at each operation and projects into the trap $a^3$, so as to be substantially submerged in the syrup so long as any syrup remains in the jar. The chamber $b^2$ is shown as cylindrical in shape and open at the bottom, the syrup being discharged from the chamber by means of a plunger $c$, which is fitted in the chamber like a piston and provided with a lifting-rod $c^2$. As herein shown, the said lifting-rod extends upwardly through the tubular passage $b$ and is guided and supported at the top in a guide member $b^4$, preferably formed integral with the nozzle portion $b^3$, the said guide member being arranged to fit in an opening through the top of the casing A. The entire dispensing device is arranged to be easily removable from the casing, so as not to be in the way if the jar is to be taken out to be refilled or replaced. As herein shown, the guide member $b^4$ is provided with a cylindrical portion $b^5$, which fits closely in the opening through the top of the casing A, there being a flange $b^6$ projecting over the edge of said opening, and thereby forming a support for the entire dispensing device. In order to discharge the syrup from the measuring-chamber $b^2$, the plunger $c$ and its lifting-rod $c^2$ are connected with an actuating device or handle $c^3$, which is herein shown as pivoted at $c^4$ in the guide member $b^4$, the pivot being herein shown as supported in a lug formed upon the top of the nozzle portion $b^3$, the actuating member $c^3$ being arranged to act upon the lifting-rod $c^2$. The said lifting-rod $c^2$ is arranged to stand normally in the position shown in Fig. 1, being provided, for example, with a weight $c^5$, which tends to carry the rod and plunger downward to the lowermost position except when the actuating member $c^3$ is operated. The plunger $c$ is provided with a series of ducts $c^6$, all of which communicate with a comparatively large inlet-opening $c^7$ at the bottom of the plunger, which inlet-opening $c^7$ is controlled by a check-valve $c^8$, so that in the downward movement of the plunger the check-valve $c^8$ will be lifted, as shown in Fig. 2, allowing the syrup to flow freely into the chamber $b^2$. In order to further facilitate the filling of the chamber $b^2$, the walls thereof are provided with slots $b^7$, extending beyond the top of the plunger $c$ when in its normal position, thus affording additional inlets for the syrup. Under normal conditions, therefore, the chamber $b^2$ stands full of syrup, the level of which in the outlet-pipe $b$ will be substantially equal to the level of the syrup in the body of the jar $a$, so that when the actuating member $c^3$ is rocked on its pivot $c^4$ to the left from the position shown in Fig. 1 the plunger $c$ will be pulled upward in the chamber $b^2$, and the opening $c^7$ will be stopped by the check-valve $c^8$, so that the syrup in the chamber $b^2$ will be forced upward and discharged through the nozzle $b^3$. Upon releasing the actuating member $c^3$ the plunger $c$ will return to its normal position through the action of the weighted portion $c^5$, and the volume of syrup in the trap $a^3$ will flow into the chamber $b^2$ through the inlet $c^7$. In the construction shown the actuating member $c^3$ is provided with an arm $c^9$, which engages in a recess $c^{10}$, formed in the weighted member $c^5$, so that a positive downward movement of the plunger $c$ can be produced, if desired. This feature of the invention renders the apparatus capable of rapid consecutive operations, since the handle $c^3$ can be moved backward and forward, the chamber $b^2$ filling with syrup regardless of the rapidity of the downward movement of the plunger.

In the construction hereinbefore described the check-valve $c^8$ is shown as a ball which lies in the mouth of the inlet $c^7$, it being immaterial, however, so far as relates to the invention, what particular type of check-valve is used.

In Fig. 3 a modified form of valve is shown, the plunger $c$ being shown as provided with a number of inlet-ducts $c^{70}$, extending directly through the plunger, these ducts being controlled by a check-valve consisting of a disk $c^{80}$, which rests upon the top of the plunger, so as to cover the ports $c^{70}$ during the upward movement of the plunger and to be forced upward so as to uncover the said ports during the downward movement of the plunger. The upward movement of the disk valve is limited by means of a shoulder $c^{21}$, formed on a member $c^{20}$, which is shown as screw-threaded into the plunger $c$ and also as having an internally-threaded opening to receive the stem $c^2$. The disk valve $c^{80}$ is provided with an opening in the middle to surround the member $c^{20}$, the said opening being smaller in diameter than the shoulder $c^{21}$. To admit of the free flow of syrup into the measuring-chamber $b^2$ when the plunger is in its normal position, the said chamber is shown as provided with lateral ports $b^{70}$ just above the top of the plunger when said plunger is in its normal position.

It is desirable in some cases to vary the amount of syrup dispensed at each operation, and for this purpose the apparatus is provided with an adjusting device to vary the extent of operation of the discharging means, such adjusting device being herein shown as a stop $b^9$, screw-threaded into a portion of the member $b^4$ and adapted to be engaged by a shoulder $c^{12}$, formed on the actuating-handle $c^3$. As herein shown, the stop $b^9$ is in such a position as to admit of the complete movement of the actuating-handle $c^3$ and of the plunger $c$, so as wholly to discharge the contents of the measuring-chamber $b^2$, it being obvious, however, that by raising the said stop by turning the same in the socket in which it is screw-threaded the movement of the handle $c^3$ and consequent movement of the plunger $c$ may be shortened, so that less than the entire contents of the measuring-chamber will be discharged at each operation. It is obvious, therefore, that the amount of syrup discharged at each operation may be varied from a maximum amount to any amount desired less than said maximum amount.

While the weight of the dispensing device as a whole is sufficient to retain the device in place without preventing the removal thereof when it is necessary to remove the jar from the casing, I prefer to provide the device with a retaining-catch $b^8$, which prevents any possibility of the displacement of the device when the actuating member $c^3$ is operated. In the construction shown the dispensing device is substantially independent of the syrup-jar and may be quickly and easily removed for cleaning, &c., and does not in any way interfere with the ready removal of the jar for refilling, &c. The device has the further advantage that the measuring-chamber $b^2$ refills during the downward movement of the plunger, so that a number of portions of syrup can be drawn consecutively and with great rapidity.

What I claim is—

1. The combination with a jar provided with a supplemental chamber or trap at the bottom; of a dispensing device comprising a tube provided with a stationary measuring-chamber projecting into said trap and with an outlet-nozzle; a plunger movable in said measuring-chamber; means for producing the movement of said plunger therein; and a casing for said jar provided with an opening to receive said dispensing device, substantially as described.

2. In a dispensing apparatus, the combination with a jar provided with a trap; of a dispensing device comprising a discharging-tube provided at the bottom with a measuring-chamber which projects into said trap; a plunger fitting said measuring-chamber and provided with a stem projecting downward through said tube; a valve in said plunger; a plunger-actuating device connected with said tube; and a casing for the jar provided with an opening over the trap, the said casing constituting a support for the dispensing device, as set forth.

3. The combination with a jar provided with a trap at the bottom, and the casing for said jar; of a dispensing device supported in an opening in the top of the casing and having a downwardly-projecting tube with a chamber open at the bottom projecting into said trap; a plunger substantially fitting said chamber and having an opening through the bottom provided with a check-valve, the said chamber also having slots which extend above the top of the plunger when in its normal position; and means for producing a vertical movement of said plunger, as set forth.

4. The combination with a jar provided with a trap at the bottom, of a dispensing device comprising a discharging-tube provided with a measuring-chamber which projects into said trap; a plunger fitting said measuring-chamber and provided with inlet-ports; a disk valve on top of said plunger to cover said ports; a casing for the jar provided with an opening; a flange connected with the dispensing device fitting said opening and removably supported therein; and a handle pivotally connected with the dispensing device for operating said plunger.

5. The combination with a jar provided with a trap at the bottom, of a dispensing device comprising a discharging-tube provided with a measuring-chamber which projects into said trap; a plunger fitting said measuring-chamber and provided with inlet-ports; a disk valve on top of said plunger to cover said ports; ports in the wall of said chamber; a casing for the jar provided with an opening, said opening constituting a support for said dispensing device; and a handle pivotally connected with said dispensing device for operating said plunger.

6. The combination with a jar provided with a trap at the bottom, of a dispensing device comprising a discharging-tube provided with a measuring-chamber which projects into said trap; means for discharging the contents of said measuring-chamber; an adjusting device to vary the extent of operation of such discharging means; and a casing for the jar constituting a support for the dispensing device.

7. In a dispensing apparatus, a casing provided with an opening at the top; a jar adapted to be slid endwise into said casing and having a trap at the bottom in line with said opening when the jar is in place, combined with a detachable dispensing device comprising a tube provided with a flange to fit the opening in the casing, and with a stationary measuring-chamber projecting into the trap in the jar and with an outlet-nozzle; a plunger movable in said measuring-chamber; and means connected with the dispensing device for producing a movement of said plunger to discharge the contents of said measuring-chamber, substantially as described.

In testimony whereof I have signed my name to this specification in the presence of two subscribing witnesses.

EDWARD E. MURPHY.

Witnesses:
   MARGARET E. COVENEY,
   HENRY J. LIVERMORE.